US012749492B2

(12) United States Patent
Rämö et al.

(10) Patent No.: US 12,749,492 B2
(45) Date of Patent: Sep. 29, 2026

(54) METHOD FOR QUANTIZING LINE SPECTRAL FREQUENCIES

(71) Applicant: NOKIA TECHNOLOGIES OY, Espoo (FI)

(72) Inventors: Anssi Sakari Rämö, Tampere (FI); Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 47 days.

(21) Appl. No.: 18/856,117

(22) PCT Filed: Mar. 14, 2023

(86) PCT No.: PCT/EP2023/056444
§ 371 (c)(1),
(2) Date: Oct. 11, 2024

(87) PCT Pub. No.: WO2023/198383
PCT Pub. Date: Oct. 19, 2023

(65) Prior Publication Data

US 2025/0252963 A1 Aug. 7, 2025

(30) Foreign Application Priority Data

Apr. 12, 2022 (GB) ...................................... 2205323

(51) Int. Cl.
*G10L 19/038* (2013.01)
*G10L 19/00* (2013.01)
(Continued)

(52) U.S. Cl.
CPC ............ *G10L 19/038* (2013.01); *G10L 19/07* (2013.01)

(58) Field of Classification Search
CPC ..... G10L 19/008; G10L 19/00; G10L 19/005; G10L 19/24; G10L 19/0208; G10L 19/04;
(Continued)

(56) References Cited

U.S. PATENT DOCUMENTS 6,148,283 A * 11/2000 Das ......................... G10L 19/07
704/E19.025
8,229,749 B2 7/2012 Ehara et al.
(Continued)

FOREIGN PATENT DOCUMENTS

| | | | |
|---|---|---|---|
| EP | 2202727 | B1 | 1/2018 |
| EP | 2727106 | B1 | 8/2019 |
| WO | WO 2022/008454 | A1 | 1/2022 |

OTHER PUBLICATIONS

Sreenivas, et al. "Vector Quantization of Scale Factors in Advanced Audio Coder AAC", Proc. of the 1998 IEEE International Conference on Acoustics, Speech and Signal Processing, ICASSP '98, pp. 3641-3644 (Year: 1998).*

(Continued)

*Primary Examiner* — Leshui Zhang
(74) *Attorney, Agent, or Firm* — ALSTON & BIRD LLP

(57) ABSTRACT

It is disclosed inter alia a method comprising: determining a first sub vector comprising a first plurality of audio parameter coefficients of an audio parameter vector, quantise the first sub vector with a first quantizer to; determining a residual vector, determine a second sub vector comprising a second plurality of coefficients of the residual vector, quantising the second sub vector with a second quantizer to give a quantised second sub vector; combining the quantised second sub vector and the quantised first sub vector to give a quantized audio parameter sub vector comprising a second plurality of quantised audio parameter coefficients; and predict at least one audio parameter coefficient for a quantized audio parameter vector using the second plurality of (Continued)

quantised audio parameter coefficients, wherein the at least one audio parameter coefficient is a higher order audio parameter coefficient than an order of the second plurality of quantised audio parameter coefficients.

20 Claims, 9 Drawing Sheets

(51) Int. Cl.
*G10L 19/032* (2013.01)
*G10L 19/07* (2013.01)

(58) Field of Classification Search
CPC ... G10L 19/02; G10L 19/0017; G10L 19/032; G10L 19/038; G10L 19/07; G10L 19/12; G10L 25/30; G10L 2019/0005; G10L 2019/0016; G06T 3/4046; G06T 9/002; G06N 3/0455; G06N 3/084; G06N 3/045; G06N 3/08; H04N 19/124; H04N 19/117; H04N 19/132; H04N 19/13; H03M 7/3059
USPC ................................ 704/500–504; 381/1–23
See application file for complete search history.

(56) References Cited

U.S. PATENT DOCUMENTS 9,202,473 B2 12/2015 Vasilache et al.
2004/0030548 A1* 2/2004 El-Maleh ................ G10L 19/12 704/E19.022
2009/0074076 A1* 3/2009 Li ....................... H03M 7/3082 375/240.22
2009/0292537 A1* 11/2009 Ehara .................... G10L 21/038 704/E19.023
2010/0211398 A1* 8/2010 Satoh .................... G10L 19/032 704/500
2016/0019900 A1* 1/2016 Vasilache ............. G10L 19/008 381/23
2016/0314797 A1* 10/2016 Vasilache ................ G10L 19/07
2017/0154632 A1* 6/2017 Sung ..................... G10L 19/038
2018/0374489 A1* 12/2018 Vasilache .............. G10L 19/012
2023/0133513 A1* 5/2023 Ravelli ................. G10L 19/008

OTHER PUBLICATIONS

Vasilache "Fast Low Bit Rate Lattice Entropy Coding for Speech and Audio Coding", 19th European Signal Processing Conference, Barcelona, Span, Aug. 29-Sep. 2, pp. 719-723 (Year: 2011).*

Ramo et al. "Segmental Speech Coding Model for Storage Applications", International Conference on Spoken Language Processing ICCP, Jeju, Jeju Island, Korea, p. 4, Oct. 4-8 (Year: 2004).*

Bouzid et al. "Split Multi-Stage Vector Quantization Based Steganography for Secure Wideband Speech Coder", 6th International Conference on Computer Science, Engineering and Information Technology CSEIT-2019, pp. 301-312, XP093052487, Nov. 23, (Year: 2019).*

"3rd Generation Partnership Project; Technical Specification Group Services and System Aspects; Codec for Enhanced Voice Services (EVS); Detailed Algorithmic Description (Release 17)", 3GPP TS 26.445 v17.0.0, (Apr. 2022), 732 pages.

"Line Spectrum Pair (LSP) and speech data compression", Proceedings of IEEE International Conference on Acoustics, Speech, and Signal Processing, (Mar. 1984), 4 pages.

"The computation of line spectral frequencies using Chebyshev polynomials", IEEE Transactions on Acoustics, Speech, and Signal Processing, vol. 34, No. 6, (Dec. 1986), 8 pages.

Bouzid, "Split multi-stage vector quantization based steganography for secure wideband speech coder", 6th International Conference on Computer Science, Engineering and Information Technology, (Nov. 2019), 12 pages.

Combined Search and Examination Report for United Kingdom Application No. GB2205323.5 dated Oct. 12, 2022, 6 pages.

Ojala et al., "Variable model order LPC quantization", Proceedings of the 1998 IEEE International Conference on Acoustics, Speech and Signal Processing, ICASSP '98, (May 15, 1998), 4 pages.

Wang et al., "Novel Hierarchical Decomposition Vector Quantization Method for High-Order LPC Parameters", IEEE/ACM Transactions on Audio, Speech, and Language Processing, vol. 23, No. 1, (Jan. 2015), 10 pages.

International Search Report and Written Opinion for Patent Cooperation Treaty Application No. PCT/EP2023/056444 dated Jun. 21, 2023, 10 pages.

* cited by examiner

METHOD FOR QUANTIZING LINE SPECTRAL FREQUENCIES

CROSS-REFERENCE TO RELATED APPLICATIONS

The present application is a national phase entry of International Application No. PCT/EP2023/056444, filed Mar. 14, 2023, which claims priority to Great Britain Application No. 2205323.5, filed Apr. 12, 2022, which are incorporated herein by reference in their entirety.

FIELD

The present invention relates to speech and audio coding methods, and in particular, to the quantization of line spectral frequency (LSF) representation of a LPC filter.

BACKGROUND

Linear predictive coding (LPC) is a technique used extensively in speech and audio coding for analysing the short term correlations in signal. The short term correlations of the speech/audio signal are modelled using a Linear Prediction (LP) filter whose coefficients are derived directly by using linear prediction analysis over the incoming signal. However, in order that the LP coefficients can be encoded for transmission or storage, they are typically transformed into another mathematical format in order to place them in a form that makes them more suitable for the subsequent steps of quantization and interpolation. One such form which has been found to be more amenable than most for quantization and interpolation is the transformation of the LP coefficients into Line Spectral Frequencies (LSF).

However, in known types of speech and audio encoders that employ LSFs to represent the LP coefficients, the procedure for quantizing the LSFs can comprise significant resource in terms of the number of bits used.

SUMMARY

Aspects of this application thus provide an efficient method in terms of the number of bits used for quantising line spectral coefficients.

There is according to a first aspect an apparatus for quantising an audio parameter vector for an audio encoder, wherein the audio parameter vector comprises a plurality of audio parameter coefficients, wherein the plurality of audio parameter coefficients constitutes the order of the of the audio parameter vector, wherein the apparatus comprises means configured to: determine a first sub vector comprising a first plurality of audio parameter coefficients of the audio parameter vector, wherein the first plurality is less than the order of the audio parameter vector; quantise the first sub vector with a first quantizer to give a quantised first sub vector; determine a residual vector by subtracting the quantised first sub vector from the audio parameter vector; determine a second sub vector comprising a second plurality of coefficients of the residual vector, wherein the second plurality is a greater number than the first plurality and less than the order of the audio parameter vector; quantise the second sub vector with a second quantizer to give a quantised second sub vector; combine the quantised second sub vector and the quantised first sub vector to give a quantized audio parameter sub vector comprising a second plurality of quantised audio parameter coefficients; and predict at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

The apparatus comprising means configured to predict at least one audio parameter coefficient for the quantized audio parameter vector using the second plurality of quantised audio parameter coefficients, may comprise means configured to: predict the at least one audio parameter coefficient using a set of predictor coefficients comprising the second plurality number of predictor coefficients, wherein each of the second plurality number of predictor coefficients is multiplied by a corresponding quantized audio parameter coefficient of the quantized audio parameter sub vector.

The apparatus may further comprise means configured to select the set of predictor coefficients from a plurality of sets of predictor coefficients.

The means configured to select the set of predictor coefficients from the plurality of sets of predictor coefficients may comprise means configured to: determine, for each set or predictor coefficients in turn, the mean square error between the audio parameter vector and the quantised audio parameter vector; and select the set of predictor coefficients which has a minimum mean square error.

The means configured to determine a residual vector by subtracting the quantised first sub vector from the audio parameter vector further may comprise means configured to; extend the residual vector by a number of zero value vector components, wherein the number of zero value vector components is given by the difference between the numerical value of the order and the numerical value of the first plurality.

The audio parameter vector is a mean removed audio parameter vector.

The first quantizer maybe is a single stage vector quantizer and the second quantizer maybe a multiple scale lattice vector quantizer.

The first quantizer maybe a multi-stage vector quantizer and the second quantizer maybe a multiple scale lattice vector quantizer.

The first quantizer maybe a single stage vector quantizer and the second quantizer maybe a multi-stage vector quantizer.

The audio parameter vector maybe a line spectral frequency vector, and wherein the audio parameter coefficients maybe line spectral frequency coefficients.

There is according to a second aspect an apparatus for dequantizing a plurality of indices representing a quantized audio parameter vector for an audio decoder, wherein the quantized audio parameter comprises a plurality of quantized audio parameter coefficients, wherein the plurality of quantized audio parameter coefficients constitutes the order of the quantized audio parameter vector, wherein the apparatus comprises means configured to: convert a first index of the plurality of indices using a codebook of a first quantizer to give a quantised first sub vector comprising a first plurality of quantized audio parameter coefficients; convert a second index of the plurality of indices using a codebook of a second vector quantizer to give a quantised second sub vector comprising a second plurality of quantized audio parameter coefficients, wherein the second plurality is a greater number than the first plurality and less than the order of the quantised audio parameter vector; combine the quantised second sub vector and the quantised first sub vector to give a quantized audio parameter sub vector comprising a second plurality of quantised audio parameter coefficients;

and predict at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

The apparatus comprising means configured to predict at least one audio parameter coefficient for the quantized audio parameter vector using the second plurality of quantised audio parameter coefficients, may comprise means configured to: predict the at least one audio parameter coefficient using a set of predictor coefficients comprising the second plurality number of predictor coefficients, wherein each of the second plurality number of predictor coefficients is multiplied by a corresponding quantized audio parameter coefficient of the quantized audio parameter sub vector.

The apparatus may further comprise means configured to use a third index to select the set of predictor coefficients from a plurality of sets of predictor coefficients.

The quantized audio parameter vector maybe a quantized mean removed audio parameter vector.

The first quantizer maybe a single stage vector quantizer and the second quantizer maybe a multiple scale lattice vector quantizer.

There is according to a third aspect a method for quantising an audio parameter vector for an audio encoder, wherein the audio parameter vector comprises a plurality of audio parameter coefficients, wherein the plurality of audio parameter coefficients constitutes the order of the of the audio parameter vector, wherein the method comprises: determining a first sub vector comprising a first plurality of audio parameter coefficients of the audio parameter vector, wherein the first plurality is less than the order of the audio parameter vector; quantizing the first sub vector with a first quantizer to give a quantised first sub vector; determining a residual vector by subtracting the quantised first sub vector from the audio parameter vector; determining a second sub vector comprising a second plurality of coefficients of the residual vector, wherein the second plurality is a greater number than the first plurality and less than the order of the audio parameter vector; quantising the second sub vector with a second quantizer to give a quantised second sub vector; combining the quantised second sub vector and the quantised first sub vector to give a quantized audio parameter sub vector comprising a second plurality of quantised audio parameter coefficients; and predicting at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

Predicting at least one audio parameter coefficient for the quantized audio parameter vector using the second plurality of quantised audio parameter coefficients, may comprise: predicting the at least one audio parameter coefficient using a set of predictor coefficients comprising the second plurality number of predictor coefficients, wherein each of the second plurality number of predictor coefficients is multiplied by a corresponding quantized audio parameter coefficient of the quantized audio parameter sub vector.

The method may further comprise selecting the set of predictor coefficients from a plurality of sets of predictor coefficients.

Selecting the set of predictor coefficients from the plurality of sets of predictor coefficients may comprise: determining, for each set or predictor coefficients in turn, the mean square error between the audio parameter vector and the quantised audio parameter vector; and selecting the set of predictor coefficients which has a minimum mean square error.

Determining a residual vector by subtracting the quantised first sub vector from the audio parameter vector may further comprise; extending the residual vector by a number of zero value vector components, wherein the number of zero value vector components is given by the difference between the numerical value of the order and the numerical value of the first plurality.

The audio parameter vector maybe a mean removed audio parameter vector.

The first quantizer maybe a single stage vector quantizer and the second quantizer maybe a multiple scale lattice vector quantizer.

The first quantizer maybe a multi-stage vector quantizer and the second quantizer maybe a multiple scale lattice vector quantizer.

The first quantizer maybe a single stage vector quantizer and the second quantizer maybe a multi-stage vector quantizer.

The audio parameter vector maybe a line spectral frequency vector, and wherein the audio parameter coefficients maybe line spectral frequency coefficients.

There is according to a fourth aspect a method for dequantizing a plurality of indices representing a quantized audio parameter vector for an audio decoder, wherein the quantized audio parameter comprises a plurality of quantized audio parameter coefficients, wherein the plurality of quantized audio parameter coefficients constitutes the order of the quantized audio parameter vector, wherein the method comprises: converting a first index of the plurality of indices using a codebook of a first quantizer to give a quantised first sub vector comprising a first plurality of quantized audio parameter coefficients; converting a second index of the plurality of indices using a codebook of a second vector quantizer to give a quantised second sub vector comprising a second plurality of quantized audio parameter coefficients, wherein the second plurality is a greater number than the first plurality and less than the order of the quantised audio parameter vector; combining the quantised second sub vector and the quantised first sub vector to give a quantized audio parameter sub vector comprising a second plurality of quantised audio parameter coefficients; and predicting at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

Predicting at least one audio parameter coefficient for the quantized audio parameter vector using the second plurality of quantised audio parameter coefficients may comprise: predicting the at least one audio parameter coefficient using a set of predictor coefficients comprising the second plurality number of predictor coefficients, wherein each of the second plurality number of predictor coefficients is multiplied by a corresponding quantized audio parameter coefficient of the quantized audio parameter sub vector.

The method may further comprise using a third index to select the set of predictor coefficients from a plurality of sets of predictor coefficients.

The quantized audio parameter vector maybe a quantized mean removed audio parameter vector.

The first quantizer maybe a single stage vector quantizer and the second quantizer maybe a multiple scale lattice vector quantizer.

The first quantizer maybe a multi-stage vector quantizer and the second quantizer maybe a multiple scale lattice vector quantizer.

The first quantizer maybe a single stage vector quantizer and the second quantizer maybe a multi-stage vector quantizer.

The quantized audio parameter vector maybe a quantized line spectral frequency vector, and wherein the quantized audio parameter coefficients maybe quantized line spectral frequency coefficients.

There is according to a fifth aspect an apparatus for quantising an audio parameter vector for an audio encoder, wherein the audio parameter vector comprises a plurality of audio parameter coefficients, wherein the plurality of audio parameter coefficients constitutes the order of the of the audio parameter vector, wherein the apparatus comprises at least one processor and at least one memory including a computer program code, the at least one memory and the computer program code configured to, with the at least one processor, cause the apparatus at least to: determine a first sub vector comprising a first plurality of audio parameter coefficients of the audio parameter vector, wherein the first plurality is less than the order of the audio parameter vector; quantise the first sub vector with a first quantizer to give a quantised first sub vector; determine a residual vector by subtracting the quantised first sub vector from the audio parameter vector; determine a second sub vector comprising a second plurality of coefficients of the residual vector, wherein the second plurality is a greater number than the first plurality and less than the order of the audio parameter vector; quantise the second sub vector with a second quantizer to give a quantised second sub vector; combine the quantised second sub vector and the quantised first sub vector to give a quantized audio parameter sub vector comprising a second plurality of quantised audio parameter coefficients; and predict at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

There is according to a sixth aspect an apparatus for dequantizing a plurality of indices representing a quantized audio parameter vector for an audio decoder, wherein the quantized audio parameter comprises a plurality of quantized audio parameter coefficients, wherein the plurality of quantized audio parameter coefficients constitutes the order of the quantized audio parameter vector, wherein the apparatus comprises at least one processor and at least one memory including a computer program code, the at least one memory and the computer program code configured to, with the at least one processor, cause the apparatus at least to: convert a first index of the plurality of indices using a codebook of a first quantizer to give a quantised first sub vector comprising a first plurality of quantized audio parameter coefficients; convert a second index of the plurality of indices using a codebook of a second vector quantizer to give a quantised second sub vector comprising a second plurality of quantized audio parameter coefficients, wherein the second plurality is a greater number than the first plurality and less than the order of the quantised audio parameter vector; combine the quantised second sub vector and the quantised first sub vector to give a quantized audio parameter sub vector comprising a second plurality of quantised audio parameter coefficients; and predict at least one audio parameter coefficient for a quantized audio parameter vector using the second plurality of quantised audio parameter coefficients, wherein the at least one audio parameter coefficient is a higher order audio parameter coefficient than an order of the second plurality of quantised audio parameter coefficients.

A non-transitory computer readable medium comprising program instructions for causing an apparatus to perform the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

BRIEF DESCRIPTION OF DRAWINGS

For better understanding of the present application and as to how the same may be carried into effect, reference will now be made by way of example to the accompanying drawings in which.

DESCRIPTION OF SOME EMBODIMENTS

The invention proceeds from the consideration that the procedure for calculating the line spectral frequencies in existing speech and audio codecs can be computationally expensive, and that there is a need to reduce this burden.

Figure 1:
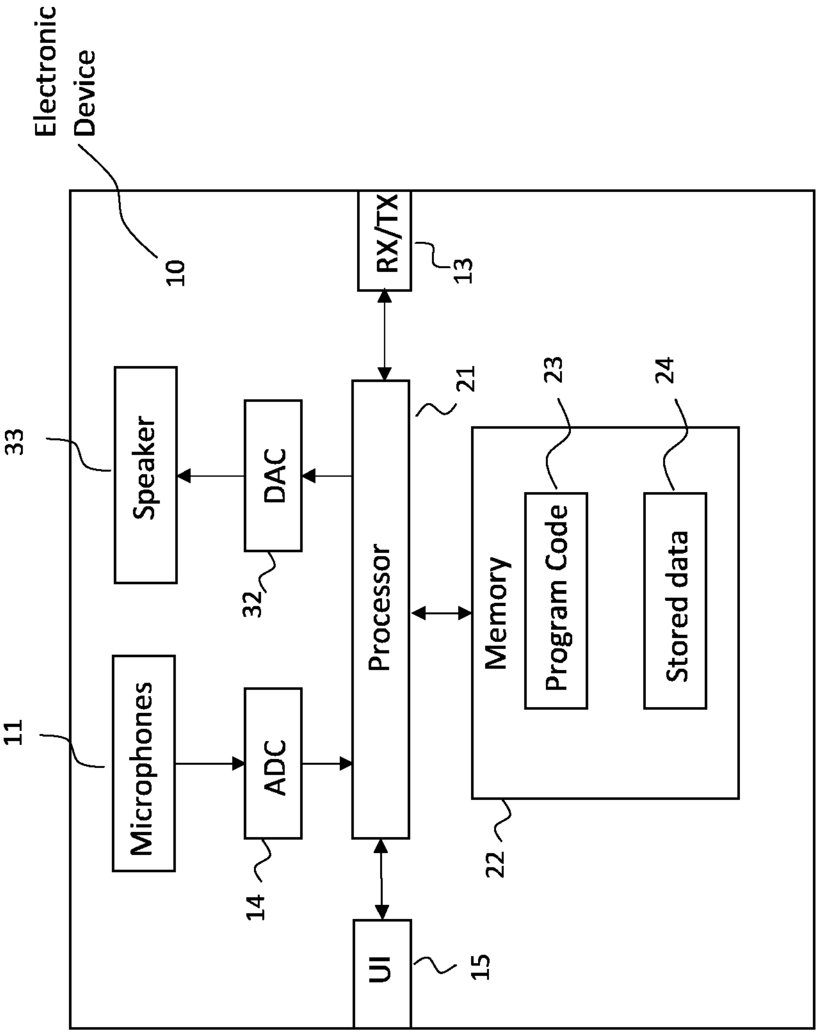
FIG. 1 shows schematically an electronic device employing some embodiments.

In this regard reference is first made to FIG. 1 which shows a schematic block diagram of an exemplary electronic device or apparatus 10, which may incorporate a codec according to an embodiment of the application.

The apparatus 10 may for example be a mobile terminal or user equipment of a wireless communication system. In other embodiments the apparatus 10 may be an audio-video device such as video camera, a Television (TV) receiver, audio recorder or audio player such as a mp3 recorder/ player, a media recorder (also known as a mp4 recorder/player), or any computer suitable for the processing of audio signals.

The electronic device or apparatus 10 in some embodiments comprises a microphone 11, which is linked via an analogue-to-digital converter (ADC) 14 to a processor 21. The processor 21 is further linked via a digital-to-analogue (DAC) converter 32 to loudspeakers 33. The processor 21 is further linked to a transceiver (RX/TX) 13, to a user interface (UI) 15 and to a memory 22.

The processor 21 can in some embodiments be configured to execute various program codes. The implemented program codes in some embodiments comprise a multichannel or stereo encoding or decoding code as described herein. The implemented program codes 23 can in some embodiments be stored for example in the memory 22 for retrieval by the processor 21 whenever needed. The memory 22 could further provide a section 24 for storing data, for example data that has been encoded in accordance with the application.

The encoding and decoding code in embodiments can be implemented in hardware and/or firmware.

The user interface 15 enables a user to input commands to the electronic device 10, for example via a keypad, and/or to obtain information from the electronic device 10, for example via a display. In some embodiments a touch screen may provide both input and output functions for the user interface. The apparatus 10 in some embodiments comprises a transceiver 13 suitable for enabling communication with other apparatus, for example via a wireless communication network.

It is to be understood again that the structure of the apparatus 10 could be supplemented and varied in many ways.

A user of the apparatus 10 for example can use the microphone 11 for inputting speech or other audio signals that are to be transmitted to some other apparatus or that are to be stored in the data section 24 of the memory 22. A corresponding application in some embodiments can be activated to this end by the user via the user interface 15. This application in these embodiments can be performed by the processor 21, causes the processor 21 to execute the encoding code stored in the memory 22.

The analogue-to-digital converter (ADC) 14 in some embodiments converts the input analogue audio signal into a digital audio signal and provides the digital audio signal to the processor 21. In some embodiments the microphone 11 can comprise an integrated microphone and ADC function and provide digital audio signals directly to the processor for processing.

The processor 21 in such embodiments then processes the digital audio signal in the same way as described with reference to the system shown in FIG. 2 and the encoder shown in FIG. 3.

The resulting bit stream can in some embodiments be provided to the transceiver 13 for transmission to another apparatus. Alternatively, the coded audio data in some embodiments can be stored in the data section 24 of the memory 22, for instance for a later transmission or for a later presentation by the same apparatus 10.

The apparatus 10 in some embodiments can also receive a bit stream with correspondingly encoded data from another apparatus via the transceiver 13. In this example, the processor 21 may execute the decoding program code stored in the memory 22. The processor 21 in such embodiments decodes the received data, and provides the decoded data to a digital-to-analogue converter 32. The digital-to-analogue converter 32 converts the digital decoded data into analogue audio data and can in some embodiments output the analogue audio via the loudspeakers 33. Execution of the decoding program code in some embodiments can be triggered as well by an application called by the user via the user interface 15.

The received encoded data in some embodiment can also be stored instead of an immediate presentation via the loudspeakers 33 in the data section 24 of the memory 22, for instance for later decoding and presentation or decoding and forwarding to still another apparatus.

Figure 2:
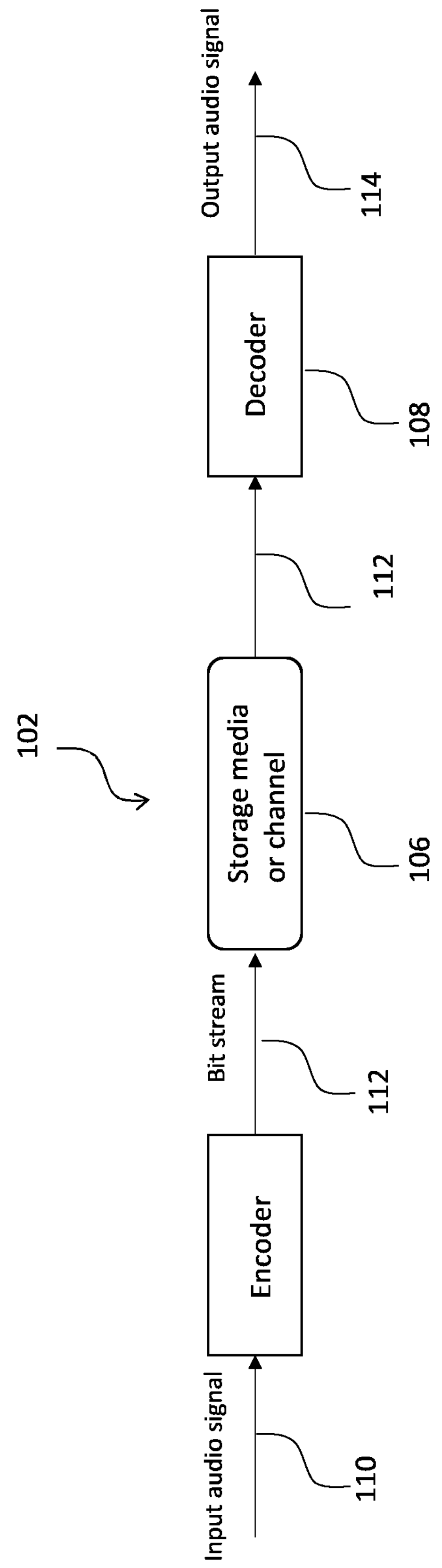
FIG. 2 shows schematically an audio codec system according to some embodiments.
Figure 3:
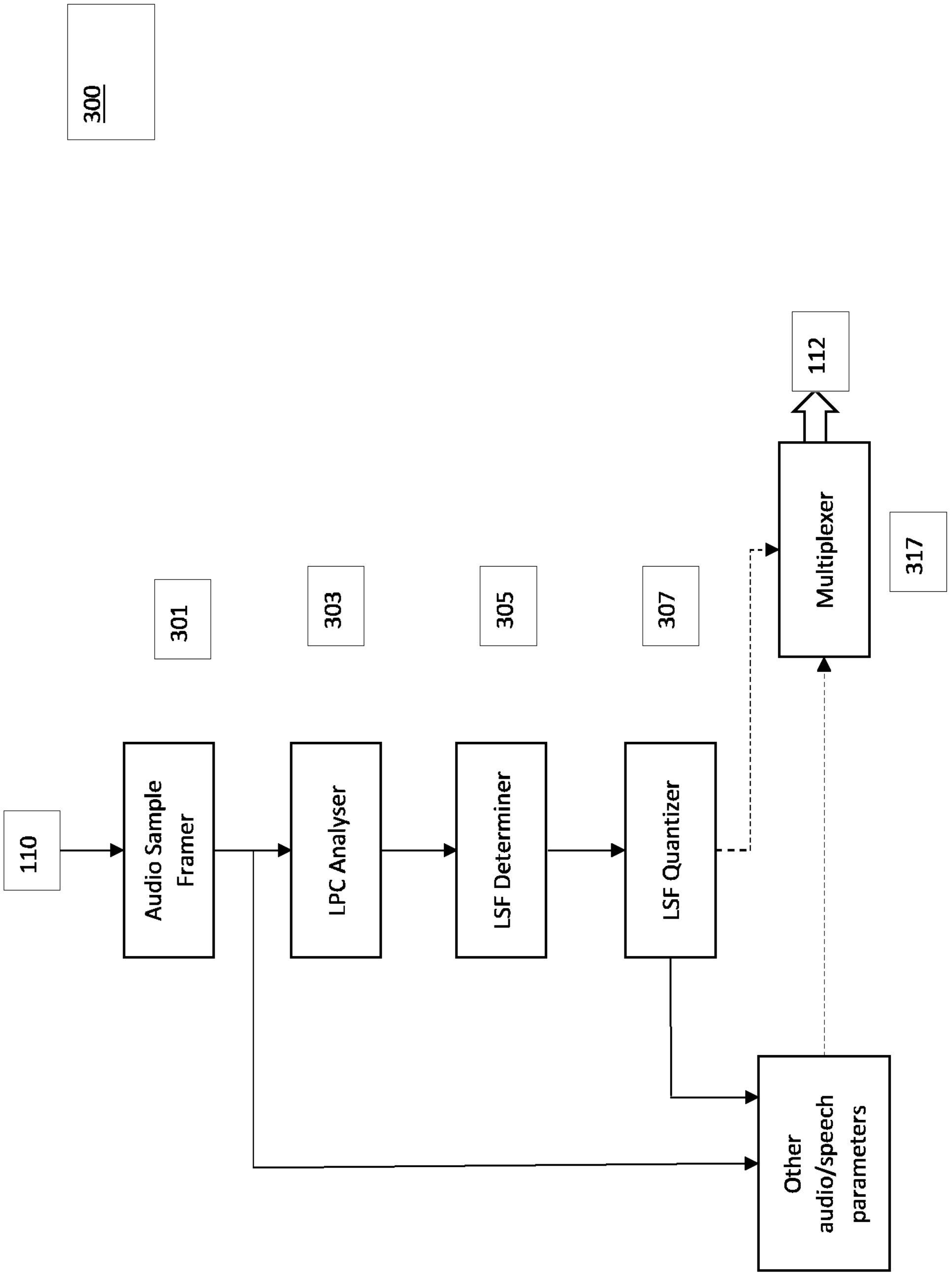
FIG. 3 shows schematically a simplified encoder as shown in FIG. 2 according to some embodiments.
Figure 4A:
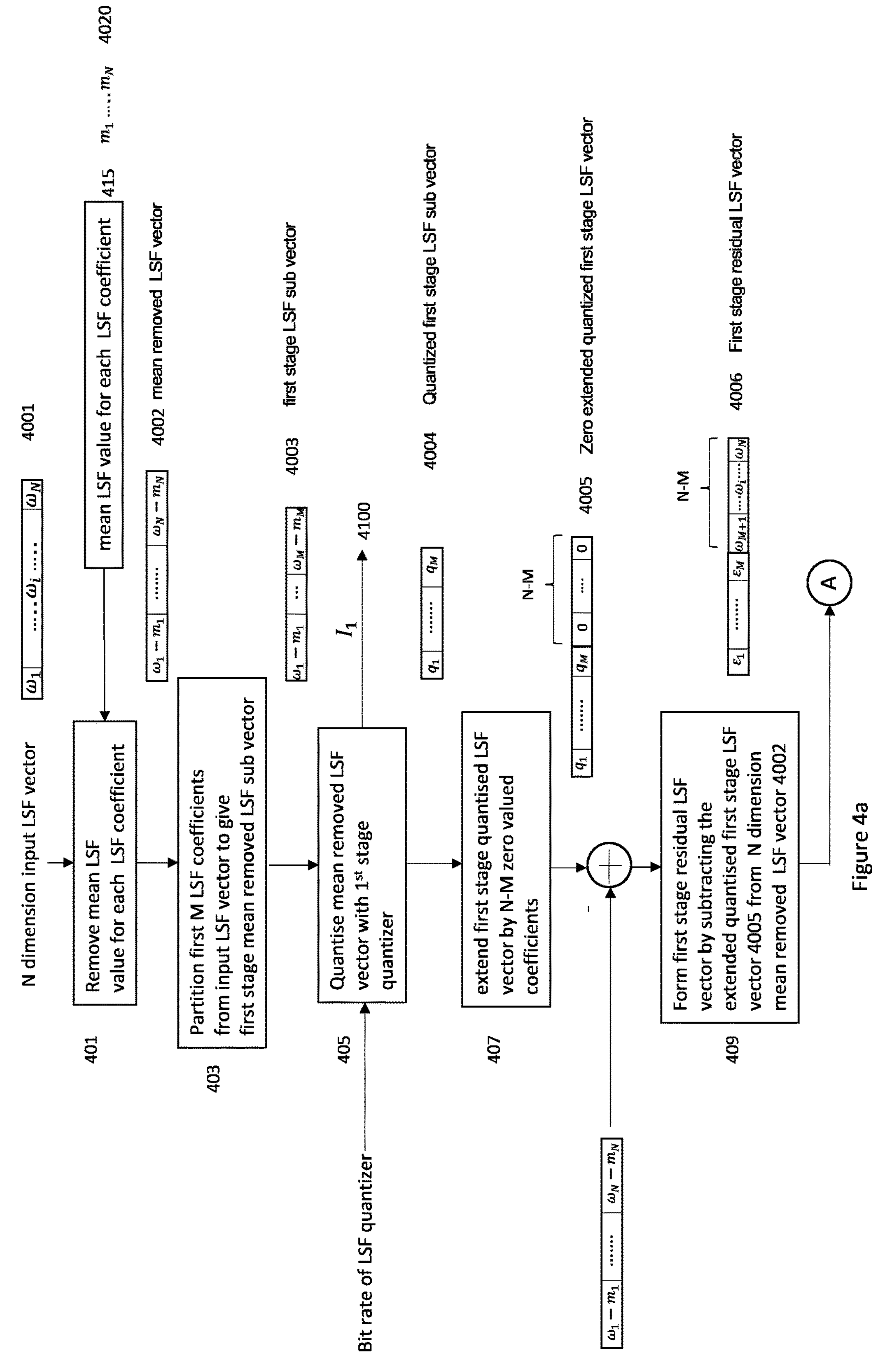
FIG. 4*a* shows a flow diagram illustrating the process of quantizing line spectral frequencies according to embodiments.
Figure 4B:
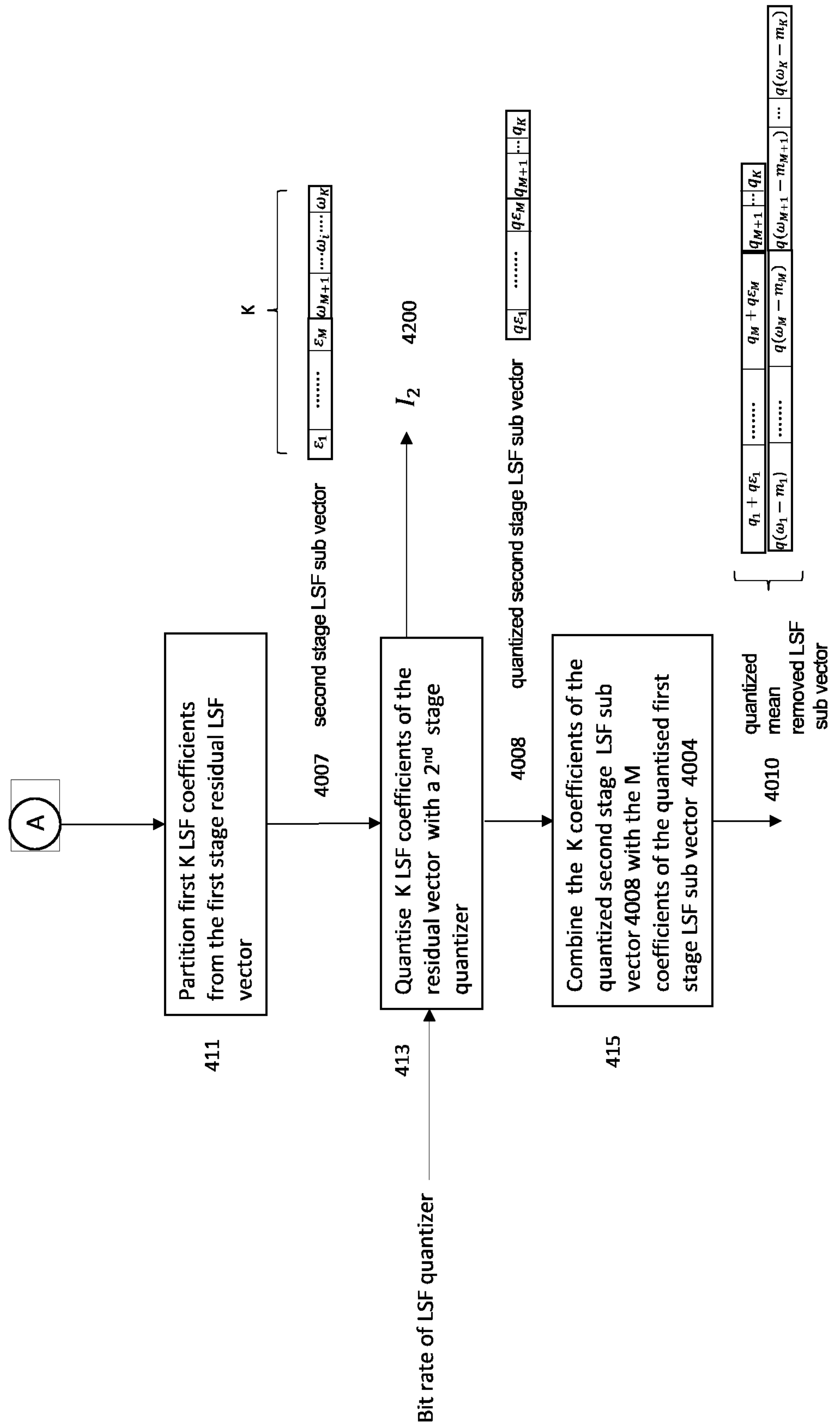
FIG. 4*b* is a continuation of the flow diagram illustrating the process of quantizing line spectral frequencies according to embodiments.

It would be appreciated that the schematic structures described in FIGS. 1 to 3, and the method steps shown in FIG. 4 represent only a part of the operation of an audio codec or speech codec and specifically part of apparatus or method for quantising Line Spectral Frequencies as exemplarily shown implemented in the apparatus shown in FIG. 1.

The general operation of audio or speech codecs as employed by embodiments is shown in FIG. 2. In general speech and audio coding/decoding systems can comprise both an encoder and a decoder, as illustrated schematically in FIG. 2. However, it would be understood that some embodiments can implement one of either the encoder or decoder, or both the encoder and decoder. Illustrated by FIG. 2 is a system 102 with an encoder 104 and in particular a speech/audio signal encoder, a storage or media channel 106 and a decoder 108. It would be understood that as described above some embodiments can comprise or implement one of the encoder 104 or decoder 108 or both the encoder 104 and decoder 108.

The encoder 104 compresses an input audio/speech signal 110 producing a bit stream 112, which in some embodiments can be stored or transmitted through a media channel 106. The encoder 104 furthermore can comprise a speech/audio encoder 151 as part of the overall encoding operation. It is to be understood that the speech/audio encoder may be part of the overall encoder 104 or a separate encoding module.

The bit stream 112 can be received within the decoder 108. The decoder 108 decompresses the bit stream 112 and produces an output audio/speech signal 114. The decoder 108 can comprise an audio/speech decoder as part of the overall decoding operation. It is to be understood that the audio/speech decoder may be part of the overall decoder 108 or a separate decoding module. The bit rate of the bit stream 112 and the quality of the output audio signal 114 in relation to the input signal 110 are the main features which define the performance of the coding system 102.

FIG. 3 shows schematically part of a simplified speech/audio encoder 104 according to some embodiments.

The concept for the embodiments as described herein is to determine the LPC coefficients for an input audio/speech frame, from the LP coefficients determine the corresponding line spectral frequencies (LSF) and then quantise the LSFs. In that regard FIG. 3 shows part of a simplified speech/audio encoding chain 300 for determining and quantizing LSFs, an example of part of an encoder 104 according to some embodiments. Furthermore, with respect to FIG. 4 the operation of at least part of the speech/audio encoder 300 is shown in further detail.

The part processing chain of a speech/audio encoder 300 is shown in FIG. 3 as receiving the input speech/audio signal 110 via the audio sample framer 301. The audio sample framer 301 separates the input audio signal into frames of convenient length, typically of the order of tens of milliseconds. For example, in an embodiment the audio sample framer 301 may segment the input speech/audio signal into frames of 20 ms, which equates to a frame of length 160 samples when the input speech/audio signal has a digital sampling rate of 8 kHz, or a frame of length 320 samples when the input speech/audio signal has a digital sampling rate of 16 kHz. However, other combinations of frame length and sampling frequency are possible. In addition, the audio sample framer 301 can also be configured to perform a windowing operation over each frame, in order to smooth the speech/audio signal at the boundaries of each frame.

Each frame may then be passed to an LPC analyser 303. The LPC analyser determines the LP coefficients for the frame. Typically the analysis of the input audio/speech frame is performed using the Levinson-Durbin algorithm in order to provide the LP coefficients. The output of the LPC analyser 303, in other words the LP coefficients may then be transformed into Line Spectral Frequencies (LSF) by the LSF determiner 305. The LSFs are then typically quantised in preparation for transmission or storage by the LSF quantizer 307. FIG. 3 also generally depicts the encoding and quantization of other audio/speech parameters as 309. The quantized LSFs along with other quantized speech/audio parameters can be multiplexed by a multiplexer 317 into a bitstream 112 for transmission over a communication channel to a corresponding decoder 108.

The following description pertains most particularly to the operation of the LSF determiner 305 as depicted in FIG. 3 in which the LPC coefficients are transformed to their corresponding Line Spectral Frequency (LSFs) values. To that end the LSFs may be derived by considering the nth degree predictor polynomial of the LP filter, n being the order of the LP filter.

$$A_n(z) = 1 + a_1 z^{-1} + \ldots + a_n z^{-n} \tag{1}$$

which satisfies the recurrence formula $$A_{n+1}(z) = A_n(z) + k_{n+1} z^{-n-1} A_n(z^{-1}) \tag{2}$$

wherein $k_1, k_2, \ldots, k_{n+1}$ are reflection coefficients. The recurrence equation (2) is the Levsinson-Durbin solution to the Yule-Walker equations. It expresses the relationship between the (n+1)th and the nth degree predictor polynomials. For the purpose of this description it is assumed that all roots of the predictor polynomial $A_n(z)$ are inside the unit circle, in other words the predictor polynomial is of a minimum phase.

By setting $k_{n+1}=1$, the recurrence equation (2) gives the polynomial $$P_{n+1}(z) \triangleq A_n(z) + z^{-n-1} A_n(z^{-1}) \tag{3}$$

which is a symmetric polynomial, i.e.

$$P_{n+1}(z) = z^{-n-1} P(z^{-1}).$$

Similarly, by setting $k_{n+1}=-1$ in (3) the antisymmetric polynomial Q(z) is obtained:

$$Q_{n+1}(z) \triangleq A_n(z) - z^{-n-1} A_n(z^{-1}) \tag{4}$$

From (3) and (4) it follows that $A_n(z)$ can be decomposed in a sum of symmetric and antisymmetric polynomials:

It is to be appreciated that the roots of the polynomials $P_{n+1}(z)$ and $Q_{n+1}(z)$ provide the Line Spectral Pairs (LSP) of the predictor polynomial. In the IEEE publication by Soong and Juang entitled "Line Spectrum Pair (LSP) and speech data compression", in the proceedings of IEEE International Conference on Acoustics, Speech and Signal Processing, San Diego, CA, pp 1.10.1 to 1.10.4, March 1984, which is incorporated herein by reference, it has been shown that if $A_n(z)$ is minimum phase, then the LSFs are on the unit circle, and the roots are simple and separate from each other. This follows therefore that $P_{n+1}(z)$ and $Q_{n+1}(z)$ can be factored as follows:

$$P_{n+1}(z) = \begin{cases} (1+z^{-1})\prod_{i=1,3,5,\ldots,n-1}(1-2z^{-1}\cos\omega_i + z^{-2}) & n \text{ even} \\ \prod_{i=1,3,5,\ldots,n}(1-2z^{-1}\cos\omega_i + z^{-2}) & n \text{ odd} \end{cases} \tag{5}$$

$$Q_{n+1}(z) = \begin{cases} (1+z^{-1})\prod_{i=1,3,5,\ldots,n}(1-2z^{-1}\cos\omega_i + z^{-2}) & n \text{ even} \\ (1+z^{-2})\prod_{i=1,3,5,\ldots,n-1}(1-2z^{-1}\cos\omega_i + z^{-2}) & n \text{ odd} \end{cases} \tag{6}$$

where $\omega_1, \omega_2, \ldots, \omega_n$ are the phase angles of the zeros of the polynomials:

$$P(z) \triangleq \prod_{i=1,3,5,\ldots,}(1-2z^{-1}\cos\omega_i + z^{-2}) \tag{7}$$

$$Q(z) \triangleq \prod_{i=2,4,6,\ldots}(1-2z^{-1}\cos\omega_i + z^{-2}) \tag{8}$$

$\omega_1, \omega_2, \ldots, \omega_n$ are the LSFs of $A_n(z)$, such that $0<\omega_1<\omega_2< \ldots, <\omega_n<\pi$.

Traditionally equations (7) and (8) are solved to give the Line Spectral Pairs (LSP) $p, p_2, \ldots, p_n$ which are defined as the cosine of the LSF, $\cos \omega_n$.

Furthermore, it is to be noted that equation (7) provide the odd numbered LSFs and equation (8) provides the even numbered LSFs. So from equation (7) it follows that the LSFs $\omega_1, \omega_3, \ldots, \omega_{n-1}$ are the zeros of P(z) in the interval $[0, \pi]$, and from equation (8) it follows that the LSFs $\omega_2, \omega_4, \ldots, \omega_n$ are the zeros of Q(z) in the interval $[0, \pi]$. It is to be further noted that the order of each of Q(z) and P(z) is half the order of the LP filter (or number of LP coefficients.)

The method of Chebyshev polynomials can be used to find the roots of equations (7) and (8) in order to obtain the LSFs $\omega_1, \omega_3, \ldots, \omega_{n-1}$ and LSFs $\omega_2, \omega_4, \ldots, \omega_n$ respectively (or LSPs $p, p_3, \ldots, p_{n-1}$ and LSPs $p_2, p_4, \ldots, p_n$ respectively)

This method is based on exploiting the symmetry of equations (7) and (8) and making the substitution of $z^k+z^{-k}=e^{j\omega k}+e^{-j\omega k}=2\cos\omega k$ resulting in (7) and (8) each being a cosine based series. In order to obviate the evaluation of the trigonometric functions, Kabel and Ranachandran suggested in "The computation of line spectrum frequencies using Chebyshev polynomials" IEEE Transactions on Acoustics, Speech and Signal Processing vol. 34, no. 6, pp. 1419-1426, 1986, that Chebyshev polynomials could be used to transform the cosine based series, and then employ a bisection algorithm to find the roots.

In accordance with the teaching of embodiments the LSFs $\omega_1, \omega_2, \ldots, \omega_n$ may be quantized by the LSF quantizer 307 as a vector of dimension n where the components of the vector are the LSFs $\omega_1, \omega_2, \ldots, \omega_n$.

LSF vector quantization techniques have been used for a considerable period of time in the areas of speech and audio coding. There are many techniques for the coding of coefficients of LSF vectors. One particular technique which has gained traction fairly recently is Multistage Vector Quantization (MSVQ) where a cascade approach is used comprising a number of quantization stages in which the output of one stage forms the input to another following stage. In this format a quantization stage may be used to form a quantized LSF vector. This quantized LSF vector is then used to generate a residual error vector by taking the vector difference between the input LSF vector (to the quantization stage) and the output quantized vector. The residual error vector can then form the input to another quantization stage, which quantizes the input residual error vector thereby forming by potentially forming a further residual error which in itself can be quantized with a further quantization stage and so on. A quantization stage may employ techniques such as prediction where passed (quantized) LSF coefficients may be used to predict LSF coefficients for a vector of current LSF coefficients. Typically, this prediction may be done separately for each LSF component $\omega_i$ of the LSF vector. Recently speech and audio codecs such as the Enhanced Voice Services (EVS) from the 3GPP standards body employ Multiple Scale Lattice Vector Quantization (MSLVQ) where a LSF vector or a sub vector of a LSF vector can be quantized using a structured lattice vector codebook as a part of a cascaded multistage quantizer. Consequently, multistage quantization stages may can employ stages which are a mixture of prediction-based stages and structured lattice vector quantization stages to quantize the LSF vector. In addition, quantizers of this type can quantize the LSF vector as a whole or treat the LSF vector has a concatenation of LSF sub vectors where each sub vector is quantized by an individual quantizer. A MSLVQ for use in embodiments may be found in the patent publication EP2727106.

These type of quantization stages are in effect fixed dimension LSF quantizers, i.e. each LSF vector whether it is the full dimension LSF vector or a sub vector of the full dimension LSF vector are treated as fixed dimension vectors and are quantized as such. It has been noticed that treating the LSF vector as a fixed vector during quantization can cause a quantization stage to quantize each coefficient of the LSF vector to a similar residual error. In some low-rate codecs this effect may not be desirable. Weighting each coefficient in an LSF vector according to a weighting function may alleviate this effect to some extent, by pre-emphasizing individual LSF coefficients in the vector before applying the process of quantization. However, it has been noticed in some circumstances the technique of applying individual weights to the coefficients of a fixed dimension LSF before quantization can result in a residual error which is perceptually sub-optimal.

Embodiments aim to address the above problem by using an approach whereby the dimension of the LSF vector is gradually increased during each quantization stage. The increase in vector dimension at each quantization stage allows for a change in the quantization "effort" to be applied on a perceptual basis. For instance, the first (or earlier) quantization stages can be arranged to quantize the lower indexed LSF coefficients (of the LSF vector) at a finer resolution than higher ordered indexed LSF coefficients. The change of quantization resolution at each quantization stage may be adapted to finely control the quantization distortion on a perceptual basis. For instance, a quantization stage may be adapted to the relative importance of the LSF coefficients associated at a particular dimension of the LSF vector coefficients at each stage.

It has been found that the approach of increasing the LSF vector dimension at each quantization stage can result in a more finely controlled distribution of the spectral error over the lower order LSF coefficients for a particular allocation of quantization bits, whilst leaving a sufficient number of bits for the quantization of the perceptually less important higher order LSF coefficients.

Figure 5:
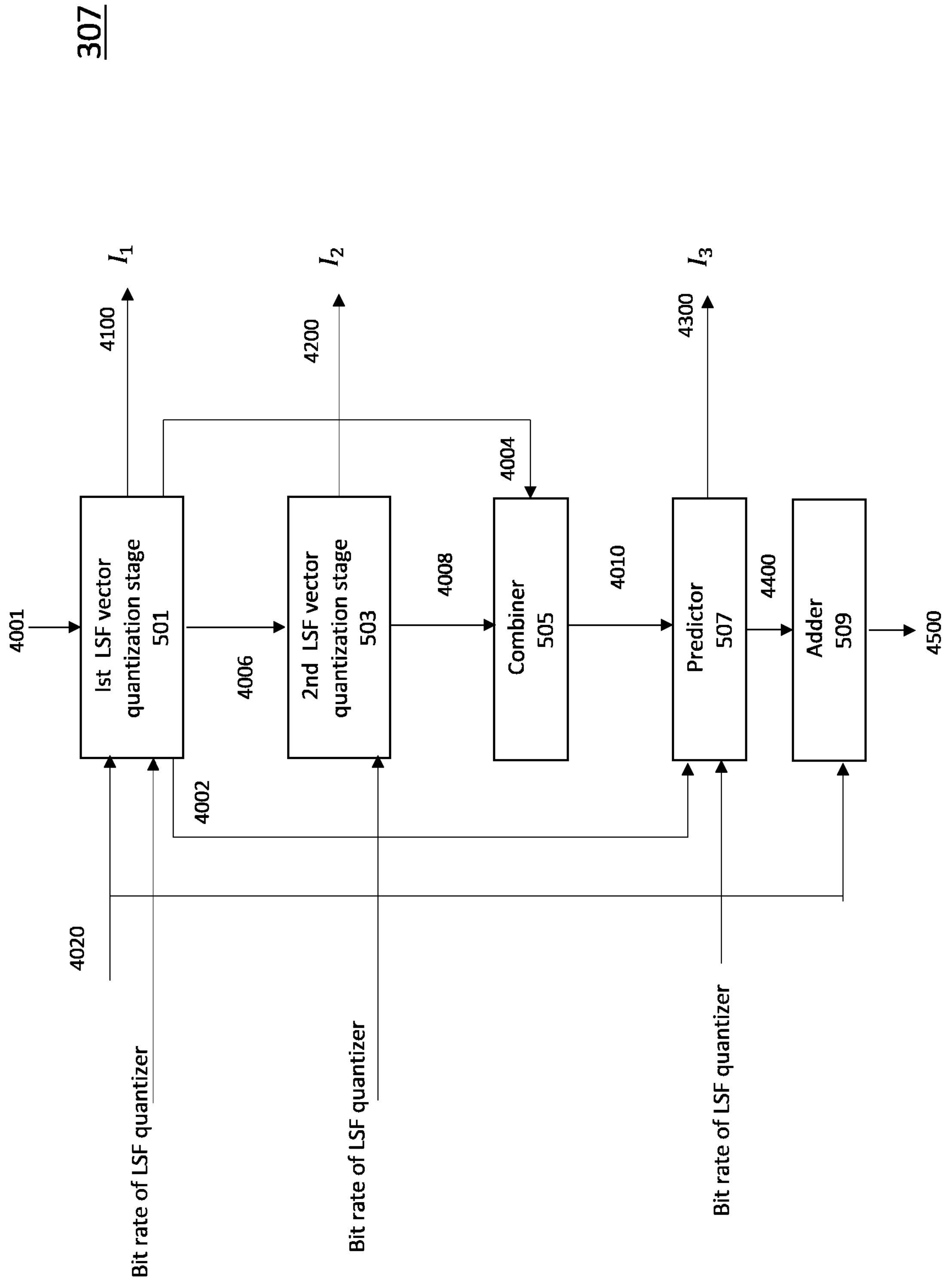
FIG. 5 shows schematically a line spectral frequency quantizer according to embodiments.

In this respect FIG. 4 is a flow diagram depicting the operation of the LSF quantizer 307 according to embodiments. In conjunction with FIG. 4, there is FIG. 5 depicting the LSF quantizer 307 in further detail.

The LSF quantizer 307 is arranged to accept the input LSF vector whose components values are the LSF coefficients $\omega_1, d_2, \ldots, \omega_N$. In this case the dimension of the vector, i.e. the number of LSF coefficients represented by the LSF vector is N. A typical value of N may be 10, in other words an LSF vector for a frame of audio may comprise 10 LSF coefficients. The input LSF vector is depicted as 4001 in FIGS. 4 and 5.

The LSF vector 4001 is received by the first stage LSF vector quantizer 501 which can be arranged to determine a mean removed LSF vector 4002 by subtracting the mean LSF coefficient value from a corresponding LSF coefficient of the input LSF vector 4001. This is performed for all N components of the LSF vector 4001. The mean value for each LSF coefficient may be determined in an offline manner using a training data base. The predetermined mean values may be stored in the memory 22 of the apparatus 10. Typically, the mean values can be stored in a read only memory (ROM). With regards to FIG. 4, the processing step 415 depicts the process of retrieving the predetermined LSF mean values from memory and providing a mean value for each corresponding LSF component (coefficient) of the input LSF sub vector 4001. The predetermined N order mean values are labelled as 4020 in FIG. 4. The step of subtracting a mean vale from each LSF component/coefficient of the input LSF vector 4001 is shown as the processing step 401 in FIG. 4.

Note, the terms LSF component and LSF coefficient may be interchanged throughout the description because an LSF component of a LSF vector is also LSF coefficient of the Nth order LSFs.

The first stage LSF vector quantizer 501 may then be arranged to partition the mean removed LSF vector 4002 to give a first stage LSF sub vector 4003 comprising the first M LSF coefficients of the mean removed LSF vector 4002. The value of M is less than the dimension N of the input LSF vector 4001. For example, in some embodiments the value of M can be six for an input LSF vector 4001 of dimension N=10. The step of determining the first stage LSF sub vector is shown as 403 in FIG. 4.

The first LSF vector quantization stage 501 is then arranged to quantize the first stage LSF sub vector 4003 by a M dimension first stage quantizer. This is depicted as the step 405 in FIG. 4. In embodiments the first stage quantizer can be a vector quantizer (VQ) arranged to quantize the M dimension first stage LSF sub vector by using a trained codebook. In other embodiments the first stage quantizer may comprise in itself be a multi-stage vector quantizer (MSVQ) where the residual output from a first VQ forms the input to a second VQ. In some embodiments it was found that a two stage MSVQ (as the first stage quantizer) was found to produce advantageous results. It is to be appreciated that this cascade approach of multiple VQ stages can be greater than two. However, the number of stages may be limited by the processing requirements for quantization and of the number of bits used for each stage. Returning to FIG. 4, the quantize first stage LSF sub vector is shown as 4004. One output from the first LSF vector quantization stage 501 may therefore be the codebook index/indices $I_1$ for the quantized first stage LSF sub vector 4004. This is depicted in FIGS. 5 and 4 as the output 4100.

The first LSF vector quantization stage 501 can be arranged to extend the quantized first stage LSF sub vector 4004 by a number of zeros so that the quantized first stage LSF sub vector is returned to its full dimension of N components. With reference to FIG. 4 this processing step is depicted as 407 where the quantized first stage LSF sub vector 4004 is extended in dimension by M-N zero component values to give the zero extended quantized first stage LSF vector is shown as 4005 in FIG. 4.

The first LSF quantization stage 501 can then be arranged to subtract the zero extended quantized first stage LSF vector 4005 from the N dimension mean removed LSF vector 4002, thereby forming the first stage residual LSF vector 4006 in FIG. 4. This is shown as the processing step 409 in FIG. 4. The first stage residual LSF vector 4006 is also shown as an output from the first LSF vector quantization stage 501. Additionally, the first LSF vector quantization stage 501 is shown as also outputting the quantized first stage LSF sub vector 4004 for subsequent processing within the combiner 505.

The LSF quantizer 307 can then be arranged to move into the second stage of the quantization process. In FIG. 5 this is depicted as being performed by the second LSF vector quantization stage 503 which is shown as receiving the first stage residual LSF vector 4006. The second LSF vector quantization stage 503 can be arranged to partition the first stage residual signal 4006 to give a second sub vector comprising the first K coefficients of the first stage residual vector 4006. The value of K for the second LSF vector quantization stage is greater than the value of M for the first stage sub vector. This results in a second stage LSF sub vector 4007 having the residual components $\varepsilon_1$ to $\varepsilon_M$ values from the first quantization stage and an additional K-M LSF coefficients from the mean removed LSF vector 4002, i.e. the LSF coefficients of $\omega_{M+1}$-$m_K$ to $\omega_K$-$m_K$. In some embodiments, the second LSF vector quantization stage 503 may take a value for K of 8. This would result in the introduction of two new mean removed LSF coefficients $\omega_7$-$m_7$ and $\omega_8$-$m_8$ to the second stage LSF sub vector 4007. The formation of the second stage LSF sub vector 4007 as performed by the second LSF vector quantization stage 503 is shown by the processing step 411 in FIG. 4.

Once the second stage LSF sub vector 4007 has been determined, the second LSF vector quantization stage 503 may move onto the next processing step of 413. This processing step entails quantizing the second stage LSF sub vector 4007 with a K dimension second stage quantizer. In embodiments the second stage quantizer can be a multiple scale lattice vector quantizer (MSLVQ) arranged to quantize the K dimension second stage LSF sub vector 4007. The use of an MSLVQ was found to produce an advantageous result especially when the first stage quantizer utilizes a VQ or MSVQ approach. An output from the second LSF vector quantization stage 503 may therefore be the index $I_2$ for the second stage quantizer. This output is depicted in FIG. 4 and FIG. 5 as 4200. FIG. 4 also shows the quantized second stage LSF sub vector as 4008.

The quantized second stage LSF sub vector 4008 may form the second output from the second LSF quantization stage 503.

The quantized second stage LSF sub vector 4008 may then be passed to the combiner 505. The combiner 505 can also be arranged to receive the quantized first stage LSF sub vector 4004 from the first LSF quantization stage 501.

The combiner 505 may then be arranged to add the M coefficients of the quantized first stage LSF sub vector 4004 with the K coefficients of the quantized second stage LSF sub vector 4008 to give a quantized LSF subvector 4010 in which the K components comprise the first K quantized coefficients for the mean removed LSF vector 4002. This is shown in FIG. 4 as the processing step 415.

Note the vector component expression in 4010 of $q(\omega_1$-$m_1)$ signifies the first quantized component of the quantized LSF sub vector.

The output from the combiner 505, the quantized LSF sub vector 4010 comprising the first K quantized coefficients of the mean removed LSF vector 4010, is then passed to the predictor 507. The predictor 507 is configured to use the K quantized coefficients of the of the vector 4010 to predict the final N-K LSF coefficients of the mean removed LSF vector 4002.

Figure 6:
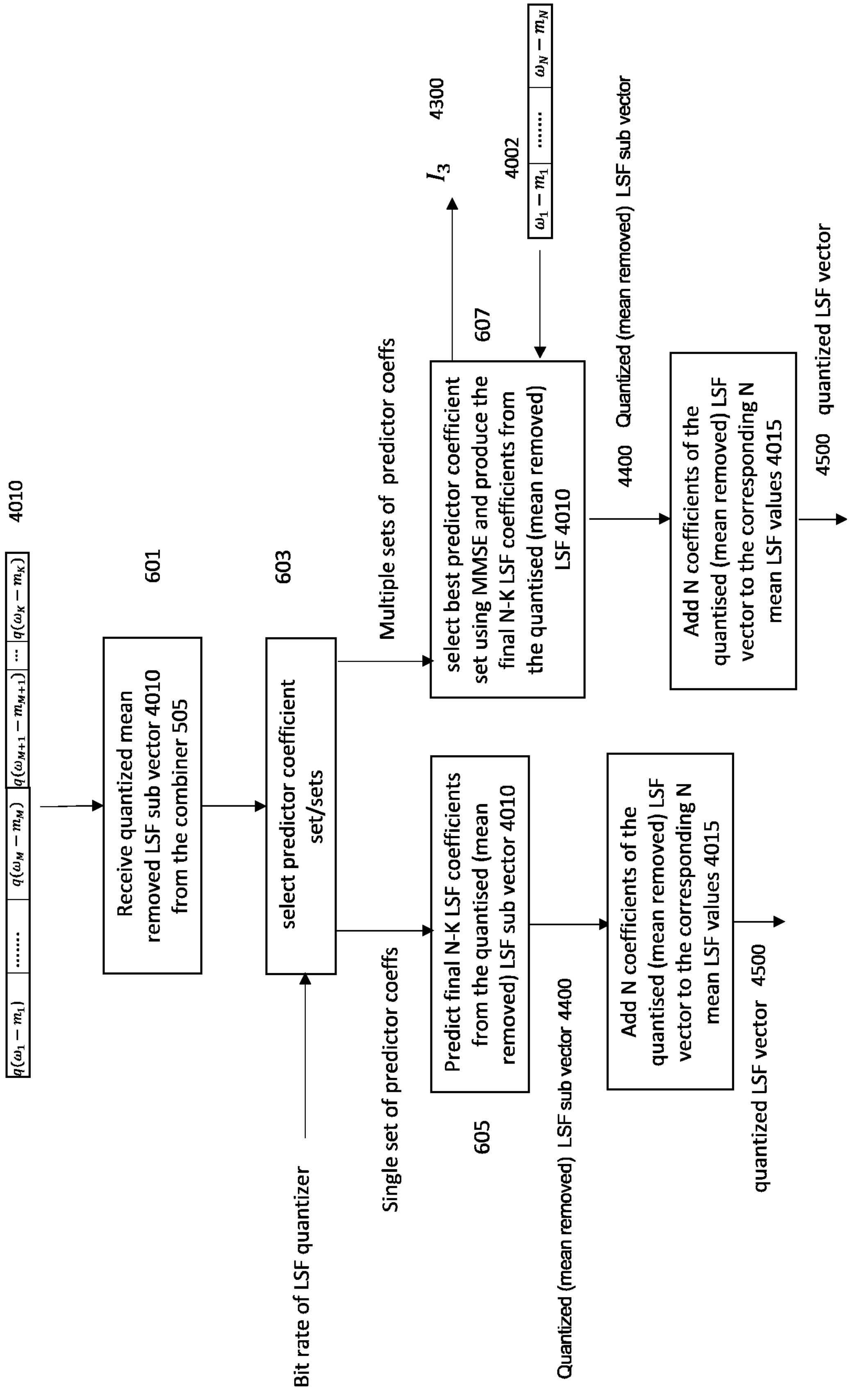
FIG. 6 shows a flow diagram of a prediction process used in conjunction with the process of quantizing line spectral frequencies according to embodiments.

The operation of the predictor 507 is shown in FIG. 6. To this end, FIG. 6 depicts the step of receiving the quantized mean removed LSF sub vector 4010 as 601.

As mentioned above the final N-K LSF coefficients can each be predicted using the K quantized coefficients of the vector 4010. In general, this may be expressed for the N-K predicted LSF coefficients as $$\widehat{\omega_l} = a_j[0] + \sum_{k=1}^{K} a_j[k] * q\omega[k] \text{ for } j = K+1 \text{ to } N \tag{9}$$

Where qω is a quantized LSF coefficient of the vector 4010, $\omega_j$ is the predicted LSF coefficient for each of the N-K coefficients and $a_j[k]$ are the K predictor coefficients used for the $j^{th}$ predicted LSF coefficient.

In embodiments the K predictor coefficients for each $j^{th}$ predicted LSF coefficient may be calculated offline from a training database, and therefore are constant for all $j^{th}$ predicted LSF coefficient. For instance, each $a_j[k]$ predictor coefficient may be trained over the database by using a minimum-mean-square-error criteria (MMSE) and using Cholesky decomposition to solve the resulting correlation matrix for each training point. Alternatively, machine learning techniques maybe used to find the optimal value of the predictor coefficients.

In one example we may have a $10^{th}$ order (N=10) LSF input vector 4001, the value of M may take the value of 6, the value of K may take the value of 8, this then leaves two LSFs (LSF 9, and LSF 10) which are each predicted using the quantized LSFs from the quantized mean removed LSF sub vector 4010 (quantized (mean removed) LSF 1 to quantized (mean removed) LSF 8). In this example predicted LSF 9 and predicted LSF 10 may be given by the following expressions $$\widehat{\omega_9} = a_9[0] + \sum_{k=1}^{K} a_9[k] * q\omega[k]$$

-continued $$\widehat{\omega_{10}} = a_{10}[0] + \sum_{k=1}^{K} a_{10}[k] * q\omega[k]$$

In embodiments the predictor 507 may be arranged to predict the final N-K (mean removed) LSF coefficients in one of number of different modes. The above expressions can be a first mode of prediction. In this mode there is only one set of predictor coefficients used to predict the final N-K (mean removed) LSF coefficients. That is the final N-K (mean removed) LSF coefficients are predicted using the following set of predictor coefficients $a_j[k]$ for j=K+1 to N and k=1 to K.

A second mode of prediction may comprise having two sets of predictor coefficients for predicting the final (mean removed) N-K LSF coefficients. That is a first set of predictor coefficients may be expressed as $a_j[k]$ for j=K+1 to N and k=1 to K and a second set of predictor coefficients may comprise a second set of trained coefficients $b_j[k]$ for j=K+1 to N and k=1 to K.

The predictor set which is used to predict the final N-K (mean removed) LSF coefficients may be selected on the basis of the mean square error between the full dimension N of the mean removed LSF vector 4002 and the fully quantized mean removed LSF vector, where the fully quantized mean removed LSF vector comprises the K quantized coefficients of the vector 4010 concatenated with the predicted N-K (mean removed) LSF coefficients. The optimum predictor set is given by the predictor set which yields the minimum mean square error (MMSE).

It is to be appreciated that optimum predictor set can be selected from any number of predictor sets. Furthermore, the optimum predictor set may also be selected by using a weighted MSE error measure, or other measures such as a mean absolute error or a root mean square error.

For example, returning to the above example of having a $10^{th}$ order input LSF vector 4001. It was found that the selection over a total of four different predictor sets can be used, where the best final N-K predicted LSF coefficients is found by the predictor set which yields the MMSE. The selected predictor set is then conveyed the decoder by the use of a 2-bit signal.

The LSF quantizer 307 may operate over a number of different bit rates. In one example the LSF quantizer can operated at a bit count per frame of between 14 to 21 bits. The distribution of bits assigned to the first LSF quantization stage 501, the second LSF quantization stage 503 and the signaling of the predictor set for the predictor stage 507 may vary according to total available number of bits for quantizing the input LSF vector 4001.

For example, returning to the above example of the $10^{th}$ order input LSF vector 4001 where the LSF quantizer 307 can operate between the rates of 14 to 21 bits per frame. It was found that the predictor 507 optimally operates between one of three different modes. A first mode comprising a single predictor set which uses no bits to signal, a second mode comprising a selection between two predictor sets which uses 1 bit to signal and a third mode comprising a selection between four predictor sets which uses 2 bits to signal.

To this end, the processing steps of the first stage quantizer 405, the second stage quantizer 413 and the predictor coefficient selection 603 (in the predictor stage) are each shown with an input configuration parameter for signaling the bit rate of the LSF quantizer. Additionally, the configuration line which signals the bit rate of the LSF quantizer is shown as an input to the $1^{st}$ LSF vector quantization stage 501, the $2^{nd}$ LSF vector quantization stage 503 and the predictor 507.

Furthermore, with reference to FIG. 6 the processing step 603 depicts the process of either selecting a group of predictor coefficient sets or a single predictor coefficient set in response to the indicated operating bit rate of the LSF quantizer 307.

Following on from processing step 603, if it is determined that bit rate of the LSF quantizer indicates the use of multiple sets predictor coefficients then process will proceed to step 607. At the processing step 607 the optimum predictor coefficient set is determined using the above described MMSE process, where the final N-K LSF coefficients are predicted in turn for each predictor coefficient set. The optimum predictor coefficient set is selected on the basis or producing the MMSE between the quantized mean removed LSF vector and the input mean removed LSF vector 4002. The final N-K LSF coefficients of the quantized LSF vector are determined as a side product when the optimum predictor coefficient set is determined.

When, at the processing step 603, the bit rate of the LSF quantizer indicates the use of a one predictor coefficient set (rather than multiple predictor coefficient sets) the predictor 507 will proceed to processing step 605. At processing step 605 the set predictor coefficients will be used to predict the final N-K (mean removed) LSF coefficients.

The output from the predictor 507 will therefore be the quantized mean removed LSF vector 4400 and an index $I_3$ 4300 indicating the predictor coefficient set used for the prediction of the final N-K LSF coefficients.

Finally, the quantized mean removed LSF vector 4400 may be passed to an adder 509 which is arranged to add the mean value from the predetermined mean vector 4020 to each corresponding quantized mean removed LSF coefficient of the LSF vector 4400. The final quantized LSF vector is shown in FIGS. 5 and 6 as 4500. The process of adding the predetermined mean vector 4020 to the quantized mean removed LSF vector 4400 is shown by the processing steps of 609 and 611 in FIG. 6.

Below sets out some examples of how the number of bits can be distributed between first LSF quantization stage 501, the second LSF quantization stage 503 and the predictor stage 507 for bit rates of between 14 to 21 bits.

The first example comprises a single vector quantizer (VQ) using a trained codebook as the first LSF vector quantization stage 501, multi scale lattice vector quantizer (MSLVQ) as the second LSF vector quantization stage 503 and either 0, 1 or 2 bits for signaling the predictor set for the predictor stage 507. The first figure gives the total bits available to quantize the input LSF vector 4001, the second set of figures give the number of bits used for the VQ as the first LSF vector quantization stage 501, the third set of figures give the number of bits used for the MSLVQ as the second LSF vector quantization stage 503 and the fourth set of figures give the number of bits to signal the predictor set for the predictor stage 507.

$$14 \text{ bits } 3b\ (VQ) + 11b\ MSLVQ + 0b$$

$$15 \text{ bits } 3b\ (VQ) + 12b\ MSLVQ + 0b$$

$$16 \text{ bits } 3b\ (VQ) + 13b\ MSLVQ + 0b$$

$$17 \text{ bits } 4b\ (VQ) + 13b\ MSLVQ + 1b$$

-continued 18 bits $4b\ (VQ)+13b\ MSLVQ+1b$ 19 bits $4b\ (VQ)+14b\ MSLVQ+1b$ 20 bits $4b\ (VQ)+14b\ MSLVQ+2b$ 21 bits $4b\ (VQ)+15b\ MSLVQ+2b$ The second example below is as the first example with the exception that the first LSF vector quantization stage uses a MSVQ.

15 bits $3b\ (3+0\,MSVQ)+11b\ MSLVQ+0b$ 16 bits $3b\ (3+0\,MSVQ)+12b\ MSLVQ+0b$ 17 bits $5b\ (3+2\,MSVQ)+11b\ MSLVQ+1b$ 18 bits $5b\ (3+2\,MSVQ)+11b\ MSLVQ+1b$ 19 bits $6b\ (3+3\,MSVQ)+12b\ MSLVQ+1b$ 20 bits $6b\ (3+3\,MSVQ)+12b\ MSLVQ+2b$ 21 bits $6b\ (3+3\,MSVQ)+13b\ MSLVQ+2b$ A third example below comprises a first stage vector quantizer (VQ) and a multi-stage vector quantizer as the second stage vector quantizer (MSVQ).

14 bits $2b(VQ)+12b(MSVQ)+0b$ 15 bits $3b(VQ)+12b(MSVQ)+0b$ 16 bits $3b(VQ)+13b(MSVQ)+0b$ 17 bits $3b(VQ)+13b(MSVQ)+1b$ 18 bits $3b(VQ)+14b(MSVQ)+1b$ 19 bits $4b(VQ)+14b(MSVQ)+1b$ 20 bits $4b(VQ)+15b(MSVQ)+1b$ 21 bits $4b(VQ)+16b(MSVQ)+1b$ Furthermore, it is to be appreciated that the indices sent from encoder to decoder as a result of the above LSF vector quantization process will comprise the index of the first LSF vector quantization stage 4100 the index of the second LSF vector quantization stage 4200 and the index of the predictor stage 4300.

Figure 7:
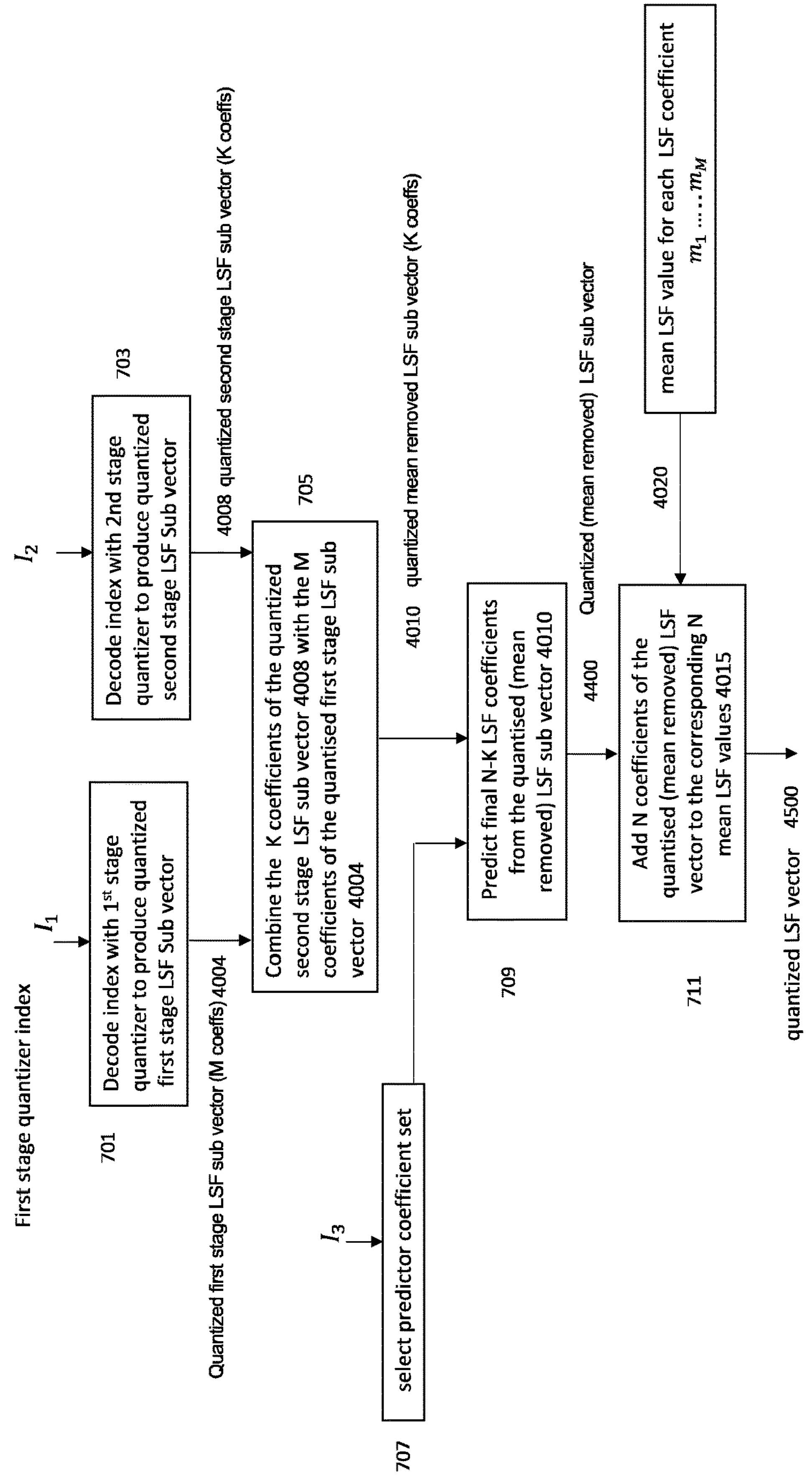
FIG. 7 shows a flow diagram of line spectral frequency de-quantizer according to some embodiments.
Figure 8:
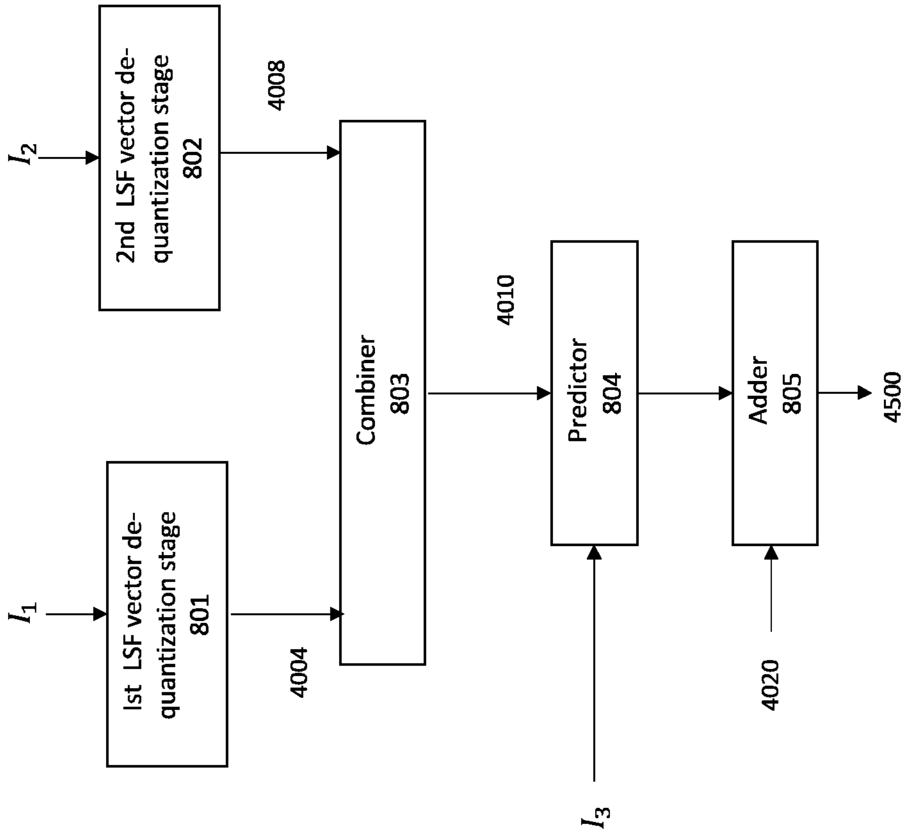
FIG. 8 shows schematically a line spectral frequency de-quantizer according to embodiments.

FIG. 7 is a flow diagram of an LSF de-quantizer configured to form the quantized LSF vector from the received indices $I_1$, $I_2$ and $I_3$. The LSF de-quantizer may the form part of the decoder 108, and the three indices $I_1$, $I_2$ and $I_3$ may form part of the received bit stream 112. In conjunction with FIG. 7, there is FIG. 8 depicting details of an LSF de-quantizer.

The LSF de-quantizer can be arranged to receive the first index $I_1$ by the first LSF vector dequantization stage 801. In embodiments the first LSF dequantization stage 801 cam comprise the same vector codebooks as the first LSF quantization stage 501. Therefore, upon receiving the first index $I_1$ the first LSF dequantization stage 801 may be arranged to produce the quantized first stage LSF sub vector 4004 from the codebook entry corresponding to the received index. With respect to FIG. 7 the processing step of generating the quantized first stage LSF sub vector 4004 from the received index $I_1$ is shown as 701.

Similarly, the LSF de-quantizer can be arranged to receive the second index $I_2$ by the second LSF vector dequantization stage 802. In embodiments the second LSF dequantization stage 802 can comprise the same structured codebooks as the second LSF quantization stage 503. Therefore, upon receiving the second index $I_2$ the second LSF dequantization stage 802 may be arranged to produce the quantized second stage LSF sub vector 4008 from the structured codebook corresponding to the received index. With respect to FIG. 7 the processing step of generating the quantized second stage LSF sub vector 4008 from the received index $I_2$ is shown as 703.

The LSF de-quantizer is then arranged to combine the K coefficients of the quantized second stage LSF sub vector 4008 with the M coefficients of the quantised first stage LSF sub vector 4004 to produce the K coefficients of the quantized mean removed LSF sub vector 4010. FIG. 8 portrays this combining step as taking place in the combiner 803 and FIG. 7 shows the combining step as the processing step 705.

The LSF de-quantizer is also arranged to receive the third index $I_3$, which is used to convey the predictor coefficient set used to predict the last N-K LSF vector coefficients of the of the quantized LSF vector 4500. As described above the predictor 507 at the encoder uses the K LSF vector coefficients of the quantized mean removed LSF sub vector 4010 together with a predictor coefficient set to predict the final N-K LSF vector coefficients. In some operating instances the encoder selects the optimum predictor coefficient set from a plurality of sets of predictor coefficients. This is information is conveyed to the LSF de-quantizer as the third index $I_3$ so that the predictor 804 can select the same optimum coefficient for predicting the final N-K vector coefficients. In other operating instances the third index $I_3$ is not used because a default predictor coefficient set is used to predict the final N-K vector coefficients. The step of selecting the optimum predictor coefficient set when the third index is sent from encoder to decoder is shown as the processing step 707 in FIG. 7.

As explained above the predictor 803 in FIG. 8 can be configured to predict the final N-K (mean removed) LSF coefficients from the K coefficients of the quantised (mean removed) LSF sub vector 4010. This can be performed in accordance with equation (9) above. The processing step of generating the quantised mean removed LSF vector 4400 by first predicting the final N-K (mean removed) LSF coefficients and then appending the predicted final N-K (mean removed) LSF coefficients to the quantised (mean removed) LSF sub vector 4010 is shown in FIG. 7 as the processing step 709.

Finally, the LSF de-quantizer is arranged to comprise an adder unit 805 whereby the mean value for each coefficient of the quantised mean removed LSF vector 4400 is added to its respective LSF coefficient by using the predetermined N dimensional mean vector 4020. This is shown in FIG. 7 as the processing step 711. The output from the adder 805 is the quantised LSF vector 4500.

Although the above quantisation and dequantization schemes has been described in terms of a LSF vector and the LSF coefficients of the LSF vector. The above quantization and quantisation and dequantization schemes can be used for other audio parameter vectors and audio parameter coefficients. For example, the above schemes can be used to quantize audio parameters such as Line Spectral Pairs and reflection coefficients.

Although the above examples describe embodiments of the application operating within a codec within an apparatus 10, it would be appreciated that the invention as described above may be implemented as part of any audio (or speech) codec. Thus, for example, embodiments of the application may be implemented in an audio codec which may implement audio coding over fixed or wired communication paths, or for store and forward applications such as a music player. Furthermore, it is to be understood that the LP filter order together with the LSF and LSP orders used above are exemplary, and the codec may be configured to implement LP filter systems at other LP filter orders.

Thus, user equipment may comprise an audio codec such as those described in embodiments of the application above.

It shall be appreciated that the term user equipment is intended to cover any suitable type of wireless user equipment, such as mobile telephones, portable data processing devices or portable web browsers.

Furthermore, elements of a public land mobile network (PLMN) may also comprise elements of a stereoscopic video capture and recording device as described above.

In general, the various embodiments of the application may be implemented in hardware or special purpose circuits, software, logic or any combination thereof.

For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for quantizing an audio parameter vector for an audio encoder, wherein the audio parameter vector comprises a first plurality of audio parameter coefficients, wherein the first plurality of audio parameter coefficients constitutes the order of the audio parameter vector, wherein the apparatus comprises at least one processor and at least one memory storing instructions that, when executed by the at least one processor, cause the apparatus at least to:

determine a first sub vector comprising a second plurality of audio parameter coefficients of the audio parameter vector, wherein the second plurality is less than the first plurality;

quantize the first sub vector with a first quantizer to give a quantized first sub vector;

determine a residual vector as a second sub vector comprising a third plurality of parameters by subtracting the quantized first sub vector from the audio parameter vector;

wherein the third plurality is a greater number than the second plurality and less than the first plurality;

quantize the second sub vector with a second quantizer to give a quantized second sub vector;

combine the quantized second sub vector and the quantized first sub vector to give a quantized audio parameter sub vector comprising a third plurality of quantized audio parameter coefficients; and predict at least one audio parameter coefficient for a quantized audio parameter vector using the third plurality of quantized audio parameter coefficients, wherein the at least one audio parameter coefficient is a higher order audio parameter coefficient than an order of the quantized audio parameter sub vector.

2. The apparatus as claimed in claim 1, wherein the apparatus caused to at least predict at least one audio parameter coefficient for the quantized audio parameter vector using the third plurality of quantized audio parameter coefficients, is caused to:

predict the at least one audio parameter coefficient using a set of predictor coefficients comprising the third plurality number of predictor coefficients, wherein each of the third plurality number of predictor coefficients is multiplied by a corresponding quantized audio parameter coefficient of the quantized audio parameter sub vector.

3. The apparatus as claimed in claim 2, wherein the apparatus is further caused to select the set of predictor coefficients from a plurality of sets of predictor coefficients.

4. The apparatus as claimed in claim 3, wherein the apparatus caused to select the set of predictor coefficients from the plurality of sets of predictor coefficients is caused to:

determine, for each set of predictor coefficients in turn, the mean square error between the audio parameter vector and the quantized audio parameter vector; and select the set of predictor coefficients which has a minimum mean square error.

5. The apparatus as claimed in claim 1, wherein the audio parameter vector is a mean removed audio parameter vector.

6. The apparatus as claimed in claim 1, wherein the first quantizer is a single stage vector quantizer and the second quantizer is a multiple scale lattice vector quantizer.

7. The apparatus as claimed in claim 1, wherein the first quantizer is a multi-stage vector quantizer and the second quantizer is a multiple scale lattice vector quantizer.

8. The apparatus as claimed in claim 1, wherein the first quantizer is a single stage vector quantizer and the second quantizer is a multi-stage vector quantizer.

9. The apparatus as claimed in claim 1, wherein the audio parameter vector is a line spectral frequency vector, and wherein the audio parameter coefficients are line spectral frequency coefficients.

10. The apparatus as claimed in claim 1, wherein the apparatus caused to at least determine the residual vector is caused to:

determine an initial residual vector by subtracting the quantized first sub vector from the audio parameter vector; and determine the second sub vector comprising the third plurality of coefficients of the initial residual vector.

11. The apparatus as claimed in claim 10, wherein the means configured apparatus caused to determine a residual vector by subtracting the quantized first sub vector from the audio parameter vector is further caused to:

extend the quantized first sub vector by a number of zero value vector components, wherein the number of zero value vector components is given by the difference between the numerical value of the first plurality and the numerical value of the second plurality.

12. An apparatus for decoding a plurality of indices representing a quantized audio parameter vector for an audio decoder, wherein the quantized audio parameter vector comprises a first plurality of quantized audio parameter coefficients, wherein the plurality of quantized audio parameter coefficients constitutes the order of the quantized audio parameter vector, wherein the apparatus comprises at least one processor and at least one memory storing instructions that, when executed by the at least one processor, cause the apparatus at least to:

convert a first index of the plurality of indices using a codebook of a first quantizer to give a quantized first sub vector comprising a second plurality of quantized audio parameter coefficients;

convert a second index of the plurality of indices using a codebook of a second vector quantizer to give a quantized second sub vector comprising a third plurality of quantized audio parameter coefficients, wherein the third plurality is a greater number than the second plurality and less than the first plurality;

combine the quantized second sub vector and the quantized first sub vector to give a quantized audio parameter sub vector comprising a third plurality of quantized audio parameter coefficients; and predict at least one audio parameter coefficient for thea quantized audio parameter vector using the third plurality of quantized audio parameter coefficients, wherein the at least one audio parameter coefficient is a higher order audio parameter coefficient than an order of the quantized audio parameter sub vector.

13. The apparatus as claimed in claim 12, wherein the apparatus caused to predict at least one audio parameter coefficient for the quantized audio parameter vector using the third plurality of quantized audio parameter coefficients, is caused to:

predict the at least one audio parameter coefficient using a set of predictor coefficients comprising the third plurality number of predictor coefficients, wherein each of the third plurality number of predictor coefficients is multiplied by a corresponding quantized audio parameter coefficient of the quantized audio parameter sub vector.

14. The apparatus as claimed in claim 13, wherein the apparatus is further caused to use a third index to select the set of predictor coefficients from a plurality of sets of predictor coefficients.

15. The apparatus as claimed in claim 12, wherein the quantized audio parameter vector is a quantized mean removed audio parameter vector.

16. The apparatus as claimed in claim 12, wherein the first quantizer is a single stage vector quantizer and the second quantizer is a multiple scale lattice vector quantizer.

17. A method for quantizing an audio parameter vector for an audio encoder, wherein the audio parameter vector comprises a first plurality of audio parameter coefficients, wherein the first plurality of audio parameter coefficients constitutes the order of the of the audio parameter vector, wherein the method comprises:

determining a first sub vector comprising a second plurality of audio parameter coefficients of the audio parameter vector, wherein the second plurality is less than the first plurality;

quantizing the first sub vector with a first quantizer to give a quantized first sub vector;

determining a residual vector as a second sub vector comprising a third plurality of coefficients by subtracting the quantized first sub vector from the audio parameter vector, wherein the third plurality is a greater number than the second plurality and less than the first plurality;

quantizing the second sub vector with a second quantizer to give a quantized second sub vector;

combining the quantized second sub vector and the quantized first sub vector to give a quantized audio parameter sub vector comprising a third plurality of quantized audio parameter coefficients; and predicting at least one audio parameter coefficient for a quantized audio parameter vector using the third plurality of quantized audio parameter coefficients, wherein the at least one audio parameter coefficient is a higher order audio parameter coefficient than an order of the of quantized audio parameter sub vector.

18. The method as claimed in claim 17, wherein determining the residual vector comprises determining an initial residual vector by subtracting the quantized first sub vector from the audio parameter vector; and determining the second sub vector comprising the third plurality of coefficients of the initial residual vector.

19. A method for decoding a plurality of indices representing a quantized audio parameter vector for an audio decoder, wherein the quantized audio parameter vector comprises a first plurality of quantized audio parameter coefficients, wherein the first plurality of quantized audio parameter coefficients constitutes the order of the quantized audio parameter vector, wherein the method comprises:

converting a first index of the plurality of indices using a codebook of a first quantizer to give a quantized first sub vector comprising a second plurality of quantized audio parameter coefficients;

converting a second index of the plurality of indices using a codebook of a second vector quantizer to give a quantized second sub vector comprising a third plurality of quantized audio parameter coefficients, wherein the third plurality is a greater number than the second plurality and less than the first plurality;

combining the quantized second sub vector and the quantized first sub vector to give a quantized audio parameter sub vector comprising a third plurality of quantized audio parameter coefficients; and predicting at least one audio parameter coefficient for the quantized audio parameter vector using the third plurality of quantized audio parameter coefficients, wherein the at least one audio parameter coefficient is a higher order audio parameter coefficient than an order of the quantized audio parameter sub vector.

20. The method as claimed in claim 19, wherein the method comprising:

predicting at least one audio parameter coefficient for the quantized audio parameter vector using the third plurality of quantized audio parameter coefficients, comprises:

predicting the at least one audio parameter coefficient using a set of predictor coefficients comprising the third plurality number of predictor coefficients, wherein each of the third plurality number of predictor coefficients is multiplied by a corresponding quantized audio parameter coefficient of the quantized audio parameter sub vector.

* * * * *